United States Patent
Avci et al.

(10) Patent No.: US 10,866,607 B1
(45) Date of Patent: Dec. 15, 2020

(54) VOLTAGE REGULATOR CIRCUIT WITH CORRECTION LOOP

(71) Applicant: Analog Devices International Unlimited Company, Limerick (IE)

(72) Inventors: Celal Avci, Istanbul (TR); James Lin, Reading, MA (US); Shawn S. Kuo, Arlington, MA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/717,231

(22) Filed: Dec. 17, 2019

(51) Int. Cl.
*G05F 1/00* (2006.01)
*G05F 1/575* (2006.01)
*G05F 1/565* (2006.01)
*G01S 7/497* (2006.01)

(52) U.S. Cl.
CPC .............. *G05F 1/575* (2013.01); *G05F 1/565* (2013.01); *G01S 7/497* (2013.01)

(58) Field of Classification Search
CPC .......... G05F 1/575; G05F 1/565; G01S 7/497; H02M 3/07; H02M 3/073; H02M 7/10; H02M 7/103; H02M 7/106
See application file for complete search history.

(56) References Cited

U.S. PATENT DOCUMENTS

| | | | |
|---|---|---|---|
| 6,201,375 B1 | 3/2001 | Larson et al. | |
| 6,377,033 B2 * | 4/2002 | Hsu | G05F 1/618 323/274 |
| 7,486,936 B2 | 2/2009 | Kappes et al. | |
| 7,714,553 B2 | 5/2010 | Lou | |
| 7,893,671 B2 | 2/2011 | Sahni et al. | |
| 7,919,954 B1 | 4/2011 | Mannama et al. | |
| 8,729,876 B2 | 5/2014 | Shen | |
| 9,122,292 B2 | 9/2015 | Pan et al. | |
| 9,239,584 B2 | 1/2016 | Lerner et al. | |
| 9,547,323 B2 | 1/2017 | Bhattad | |
| 9,671,803 B2 | 6/2017 | Oikarinen | |
| 9,671,804 B2 | 6/2017 | Kronmueller et al. | |

(Continued)

FOREIGN PATENT DOCUMENTS

CN 106200741 A 12/2016

OTHER PUBLICATIONS

"TPS7A39 Dual, 150-mA, Wide VIN Positive and Negative LDO Voltage Regulator", Texas Instruments Data Sheet, (2017), 51 pgs.

(Continued)

*Primary Examiner* — Adolf D Berhane
*Assistant Examiner* — Afework S Demisse
(74) *Attorney, Agent, or Firm* — Schwegman Lundberg & Woessner, P.A.

(57) ABSTRACT

Techniques that can prevent the low dropout (LDO) output voltage degradation that occurs with conventional LDO regulators, even with large LDO supply variations. An LDO regulator circuit can include another loop that is much slower than the main LDO regulator loop, concentrates the load regulation, and fixes the voltage regulation runaway problem due to the large supply variation with large frequency content. The LDO regulator circuit can include a negative feedback correction loop that corrects the LDO output by, in some examples, adding sink current to the main voltage regulation loop via a programmable current sink element.

20 Claims, 7 Drawing Sheets

(56) References Cited

U.S. PATENT DOCUMENTS

| | | | |
|---|---|---|---|
| 9,753,476 | B1 | 9/2017 | Shukla et al. |
| 9,846,445 | B2 | 12/2017 | Pigott et al. |
| 9,886,044 | B2 | 2/2018 | Chen et al. |
| 9,891,643 | B2 | 2/2018 | El-nozahi et al. |
| 9,927,828 | B2 | 3/2018 | Shukla et al. |
| 10,156,862 | B2 | 12/2018 | Krenzke |
| 10,171,065 | B2 | 1/2019 | Raychaudhuri |
| 2008/0129377 | A1 | 6/2008 | You et al. |
| 2017/0351284 | A1* | 12/2017 | Avci ................ G05F 1/575 |
| 2017/0364111 | A1 | 12/2017 | Flaibani et al. |
| 2019/0324484 | A1* | 10/2019 | Cheng .............. G05F 1/575 |

OTHER PUBLICATIONS

Asefi, Saina, et al., "Low-Quiescent Current Class-AB CMOS LDO Voltage Regulator", IEEE Transactions Symposium on Circuits and Systems (ISCAS), (2018), 4 pgs.

Lim, Sungkeun, et al., "Low-Dropout (LDO) Regulator Output Impedance Analysis and Transient Performance Enhancement Circuit", 25th Annual IEEE Applied Power Electronics Conference and Exposition (APEC), (2010), 1875-1878.

Man, Tsz Yin, et al., "A High Slew-Rate Push-Pull Output Amplifier for Low-Quiescent Current Low-Dropout Regulators with Transient-Response Improvement", IEEE Transactions on Circuits and Systems—II: Express Briefs, 54(9), (Sep. 2007), 755-759.

Park, Yongwan, et al., "On-Chip Hybrid Regulator Topology for Portable SoCs with Near-Threshold Operation", IEEE International Symposium on Circuits and Systems (ISCAS), (2016), 786-789.

* cited by examiner

VOLTAGE REGULATOR CIRCUIT WITH CORRECTION LOOP

FIELD OF THE DISCLOSURE

This document pertains generally to power supply devices and more particularly to voltage regulators.

BACKGROUND

Electronic systems can include devices that utilize a regulated power source. Power converter circuitry can be used to provide a circuit supply rail having a regulated voltage. A low dropout ("LDO") regulator is a DC linear voltage regulator that can operate with a very small input/output differential voltage.

A traditional LDO regulator includes a transistor, typically a field-effect transistor (FET) and a differential amplifier with a resistor divider in the feedback path. One input of the differential amplifier monitors a fraction of the output determined by the resistor divider ratio, while the second input of the differential amplifier is coupled to a stable voltage reference, such as a bandgap reference. If the output voltage rises too high relative to the reference voltage, then the drive to the transistor changes to maintain a constant output voltage.

LDO regulators, which are widely used to power up noise sensitive rails in, for example, analog to digital converters, digital to analog converters, and radiofrequency circuitry can have a number of advantages. For example, LDO regulators can have a high power supply rejection ratio ("PSRR") and low output noise performance. In addition, LDO regulators can advantageously include a lower minimum operating voltage, higher efficiency operation and lower heat dissipation.

SUMMARY OF THE DISCLOSURE

Short pulses in a laser driver can generate very large dv/dt and di/dt variations when coupled to other nodes, especially supply nodes. The present inventors have recognized that these large variations can result in severe problems when such a supply is used as a low dropout ("LDO") regulator supply input. Using conventional LDO regulators, the LDO output voltage can degrade substantially, which can disturb the performance of the entire die and can even destroy transistors connected to the LDO output supply. Conventional LDO regulators cannot overcome the large LDO supply variations due to the supply coupling to the pass transistor gate and also its larger bandwidth.

This disclosure describes techniques that can prevent the LDO output voltage degradation that occurs with conventional LDO regulators, even with large LDO supply variations. More particularly, the present inventors have recognized that an LDO regulator circuit can include a negative feedback correction loop that corrects the LDO output by, in some examples, adding sink current to the main voltage regulation loop via a programmable current sink element.

In some aspects, this disclosure is directed to a voltage regulator circuit configured to output a regulated output voltage, the voltage regulator circuit comprising: a main voltage regulation loop configured to generate the regulated output voltage; and a negative feedback correction loop having a bandwidth less than a bandwidth of the main voltage regulation loop, the correction loop configured to: receive a representation of the regulated output voltage and compare the representation to a reference voltage; and control a device coupled to an output of the main voltage regulation loop to correct the regulated output voltage based on the comparison.

In some aspects, this disclosure is directed to a method of correcting a level of a regulated output voltage of a voltage regulator circuit, the method comprising: generating the regulated output voltage by a main voltage regulation loop; in a negative feedback correction loop having a bandwidth less than a bandwidth of the main voltage regulation loop: receiving a representation of the regulated output voltage and comparing the representation to a reference voltage; and controlling a device coupled to an output of the main voltage regulation loop to correct the regulated output voltage based on the comparison.

In some aspects, this disclosure is directed to a voltage regulator circuit configured to generate a regulated output voltage, the voltage regulator circuit comprising: a main voltage regulation loop including: a first amplifier configured to receive a reference voltage and a feedback voltage representing the regulated output voltage; a pass transistor coupled to an upper voltage rail and an output of the error amplifier, the pass transistor configured to generate the regulated output voltage; and a negative feedback correction loop including: means for receiving at least one of the regulated output voltage or the feedback voltage; and means for controlling a current sink to sink current to adjust a level of the regulated output voltage.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Optical systems such as light detection and ranging (LIDAR) systems, time-of-flight cameras, and range finders, can emit one or more pulses of light toward one or more objects, and the arrival time of the light reflected from the object(s) is recorded. Based on the arrival time and the speed of light, the distance between the light source and the object(s) can be derived.

A laser diode driver circuit (or "laser driver") of a LIDAR system can drive a laser diode with narrow and high current pulses to emit light pulses onto the object, which can be centimeters to hundreds of meters away. Laser drivers in LIDAR systems use high powered, short pulses from 100 picoseconds (ps) to 100 nanoseconds (ns).

The short pulses in the laser driver can generate very large dv/dt and di/dt variations when coupled to other nodes, especially supply nodes. The present inventors have recognized that these large variations can result in severe problems when such a supply is used as a low dropout ("LDO") regulator supply input. Using conventional LDO regulators, the LDO output voltage can degrade substantially, which can disturb the performance of the entire die and can even destroy transistors connected to the LDO output supply. Conventional LDO regulators cannot overcome the large LDO supply variations due to the supply coupling to the pass transistor gate and also its larger bandwidth.

This disclosure describes techniques that can prevent the LDO output voltage degradation that occurs with conventional LDO regulators, even with large LDO supply variations. More particularly, the present inventors have recognized that an LDO regulator circuit, e.g., for use on a laser driver die, can include another loop that is much slower than the main LDO regulator loop, concentrates the load regulation, and fixes the voltage regulation runaway problem due to the large supply variation with large frequency content. As described in detail below, the LDO regulator circuit can include a negative feedback correction loop that corrects the LDO output by, in some examples, adding sink current to the main voltage regulation loop via a programmable current sink element.

Figure 1:
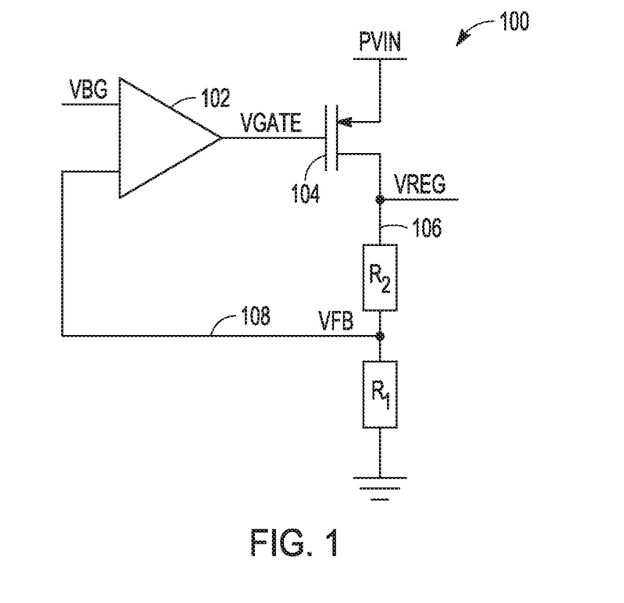
FIG. 1 is an example of a low dropout regulator circuit.

FIG. 1 is an example of a low dropout regulator circuit. The LDO regulator circuit 100 can include an amplifier circuit 102 having an output coupled to a pass transistor 104, such as a P-type or N-type field-effect transistor (FET) or bipolar junction transistor (BJT). The pass transistor 104 can be coupled to an upper supply voltage rail PVIN and an output node 106 of the amplifier circuit 100 and can be configured to generate the regulated output voltage VREG.

The amplifier circuit 100 is configured to receive a stable reference voltage VBG, such as a bandgap reference, at a first input. At a second input, the amplifier circuit 100 is configured to receive, via a feedback path 108, a representation of the regulated output voltage VREG from the resistor divider formed by resistors R1 and R2, e.g., a feedback voltage VFB. The amplifier circuit 100 can compare the representation of the regulated output voltage VREG to the reference voltage VBG and generate an output voltage VGATE that increases as the difference between the two voltages increases in order to maintain a constant regulated output voltage VREG.

Figure 2:
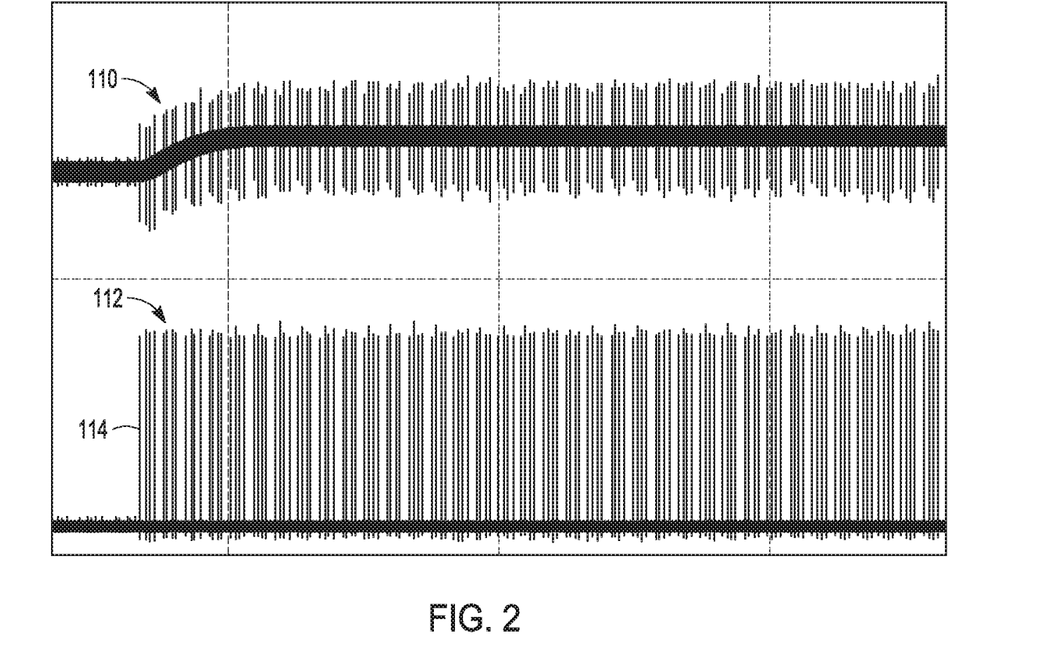
FIG. 2 are graphs from a computer simulation depicting frequent changes in a supply of a laser driver and corresponding changes in a regulated output voltage.

As mentioned above, in a laser driver die, each firing of the laser can cause the LDO supply voltage PVIN to jump up and down with narrow pulse widths and extremely large amplitudes. This large variation in the supply voltage PVIN can cause the regulated output voltage VREG of the LDO to increase, as shown in FIG. 2. The same issue can even cause the low frequency content of the regulated output voltage VREG to be increased.

FIG. 2 are graphs from a computer simulation depicting frequent changes in a supply of a laser driver and corresponding changes in a regulated output voltage. In FIG. 2, the regulated output voltage VREG of FIG. 1 is shown at graph 110 and the LDO supply voltage PVIN of FIG. 1 is shown at graph 112.

The pulses of the laser driver can cause the LDO supply voltage PVIN, shown at graph 112, to jump frequently, as illustrated by spikes 114. As the supply voltage PVIN jumps, the difference between the supply voltage PVIN and the gate voltage VGATE of the pass transistor 104 of FIG. 1, which is the gate-to-source voltage VGS of the pass transistor 104, increases. As the gate-to-source voltage VGS increases, the current flowing through the pass transistor pumps charge into the output node 106 of FIG. 1. With each supply voltage jump, the regulated voltage VREG increases as the charge at the output node 106 increases. In a conventional LDO, there is no good leakage path or sink path to remove the charge that builds up at the output node because of its high resistance to ground. In the die simulated, the LDO regulated output voltage increased from 5V to 5.7V (more than 15%), which is more than desired.

Figure 3:
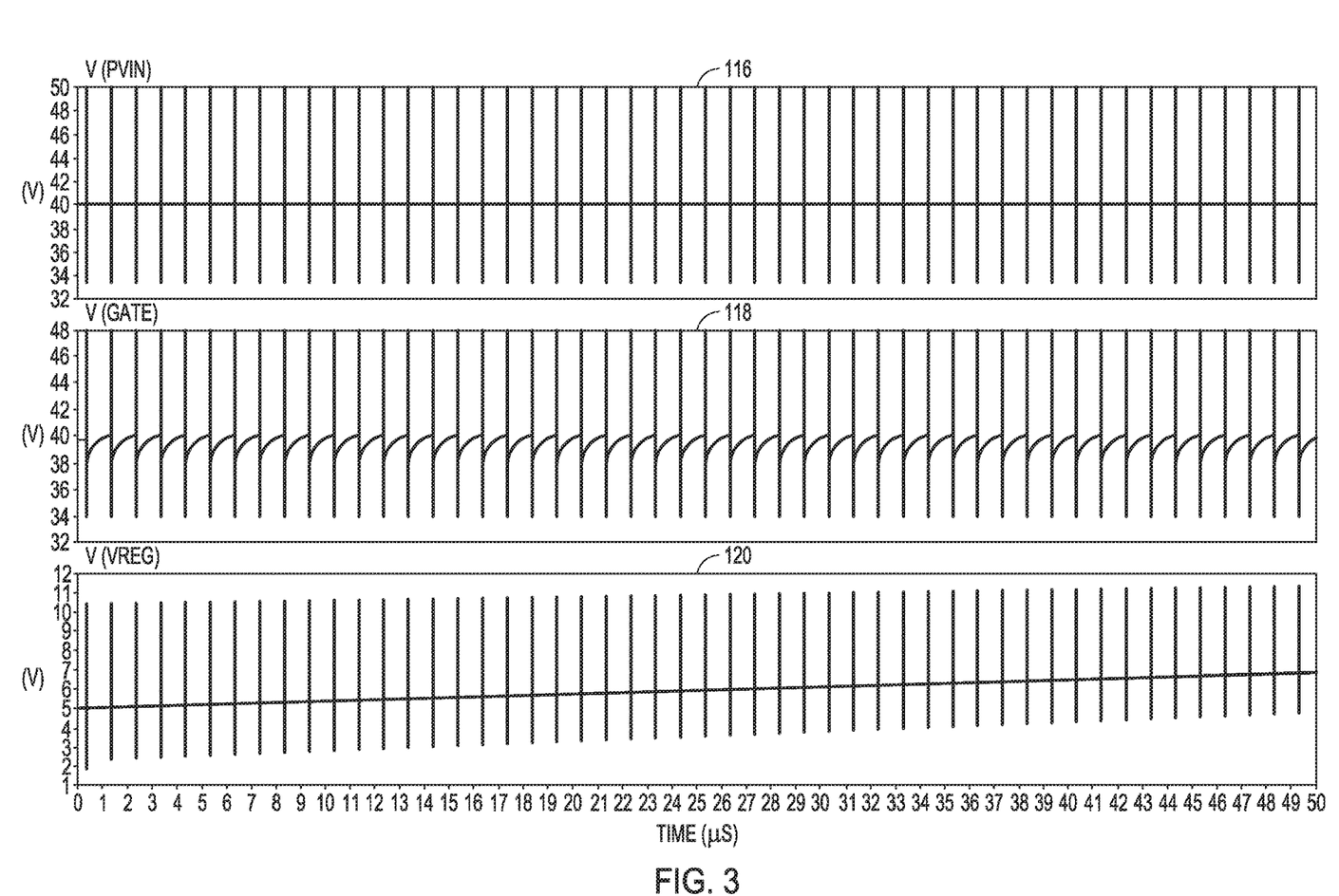
FIG. 3 are graphs from a computer simulation depicting frequent changes in a supply of a laser driver and corresponding changes in a regulated output voltage and a gate voltage of a pass transistor.

FIG. 3 are graphs from a computer simulation depicting frequent changes in a supply of a laser driver and corresponding changes in a regulated output voltage and a gate voltage of a pass transistor. As seen in FIG. 3, the LDO supply voltage PVIN, shown at graph 116, has a nominal voltage of 40V, but jumps between about 50V and 34V. The gate voltage, shown at graph 118, on the pass transistor, e.g., pass transistor 104 of FIG. 1, is also changing. As a result, the regulated output voltage VREG, shown at graph 120, increases.

The LDO supply voltage PVIN and the regulated output voltage VREG variations have low frequency content, e.g., as low as DC to several kilohertz, which in turn affects the regulated output voltage VREG. In the simulation shown, the regulated output voltage VREG increases to 7V. As such, the conventional LDO architecture simulated is unsuitable for large jumps in the LDO supply voltage (and/or ground voltage) that can occur when the LDO regulator is located within a laser driver die.

As mentioned above, the present inventors have recognized that an additional loop can be added to the LDO regulator circuit to prevent the LDO output voltage degradation that occurs with conventional LDO regulators, even with large LDO supply variations. As described in detail below, the LDO regulator circuit can include a negative feedback correction loop that corrects the LDO output by, in some examples, adding sink current to the main voltage regulation loop via a programmable current sink element. The correction loop can be much slower than the LDO loop, can concentrate only the load regulation, and can fix the voltage regulation runaway problem due to very large supply variation with large frequency content.

Figure 4:
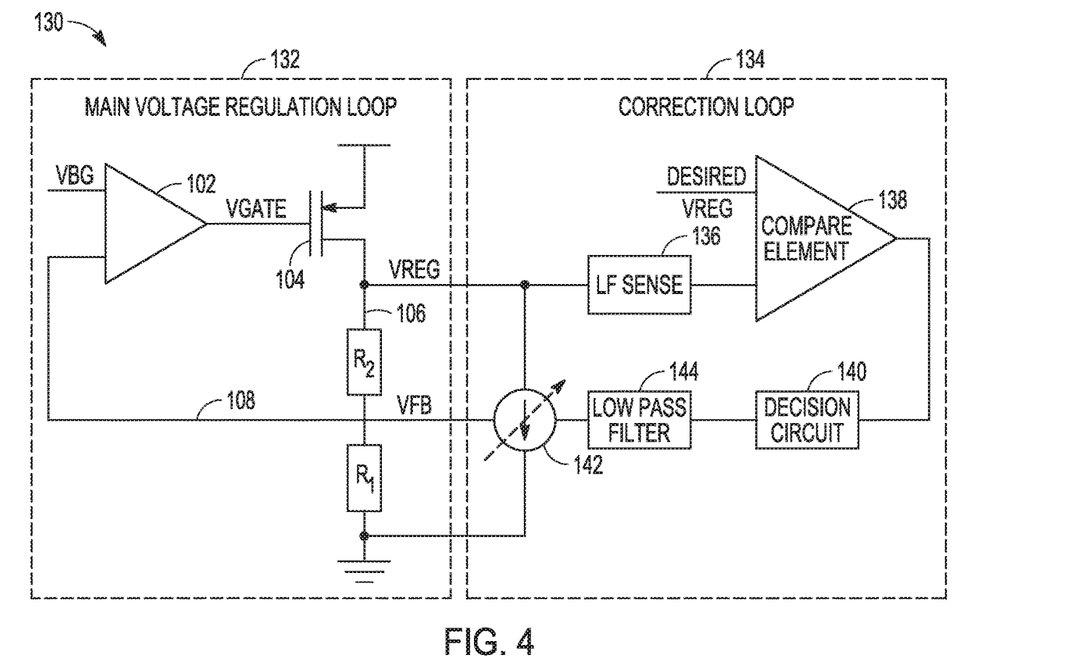
FIG. 4 is a block diagram of an example of a regulator circuit with a correction loop that can implement various techniques of this disclosure.

FIG. 4 is a block diagram of an example of a regulator circuit with a correction loop that can implement various techniques of this disclosure. The LDO regulator circuit 130 of FIG. 4 includes a main voltage regulation loop 132 and a correction loop 134. Components in FIG. 4 that are similar to components in FIG. 1 are labeled with similar reference numbers and, for purposes of conciseness, will not be described again.

The correction loop 134 can be a negative feedback loop and can be configured to receive a representation of the regulated output voltage VREG, generated by a low frequency sense circuit 136, such as a resistor divider. A comparison circuit 138 can compare the representation of the regulated output voltage VREG to a reference voltage, such as a bandgap reference. Using the output of the comparison element 138, a decision circuit 140 can generate a control signal to control a device, e.g., a current sink 142 or a switch (depicted in FIG. 10), coupled to an output of the main voltage regulation loop to correct the regulated output voltage VREG based on the comparison.

As shown in FIG. 4, the correction loop 134 can include a low pass filter circuit 144 coupled to the decision circuit 140 to set the bandwidth of the correction loop 134. Although shown in FIG. 4 as being coupled to an output of the decision circuit, the low pass filter circuit 144 can be located elsewhere within the correction loop 134, such as coupled to an input of the decision circuit, as shown and described below.

In the example shown in FIG. 4, when the low frequency level of the regulated output voltage VREG increases, the current sink 142 starts to increase and pulls more charge from the output node 106 to correct the low frequency level of the regulated output voltage VREG. When the low frequency level of the regulated output voltage VREG decreases, the current sink 142 starts to decrease and pulls less charge from the output node to correct the low frequency level of the regulated output voltage VREG. As described below with respect to FIG. 10, an alternative implementation can use a digital controller to control operation of a switch, e.g., transistor, such as a field-effect transistor, to pull charge from the output node based on an output of a comparator.

Figure 5:
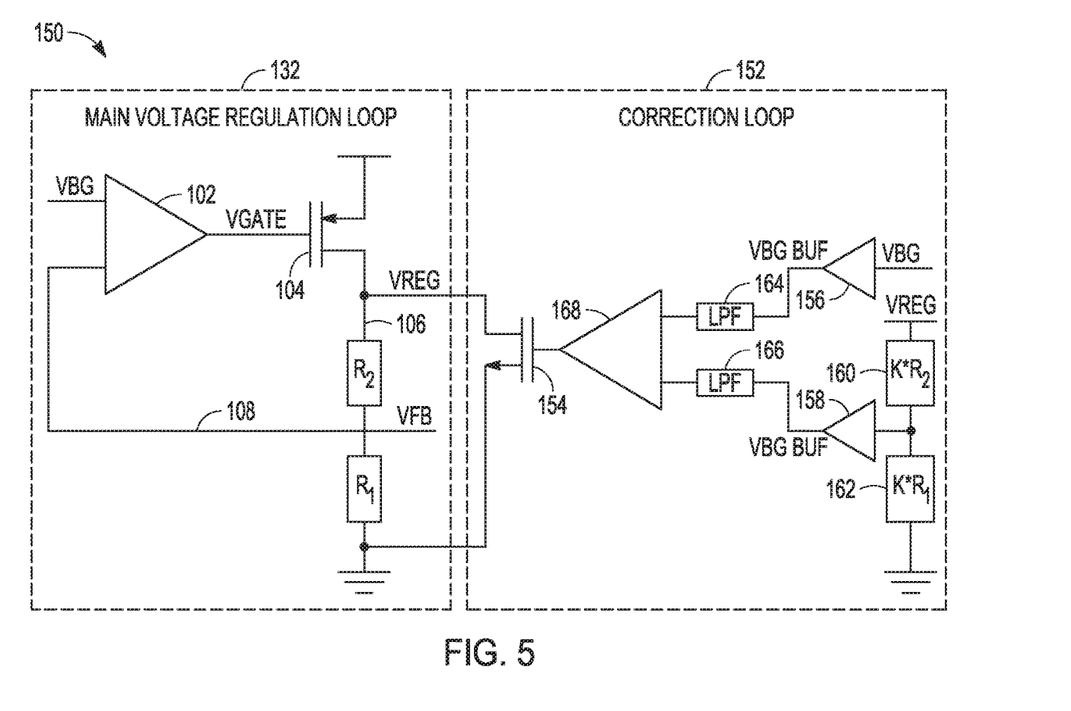
FIG. 5 is a block diagram of another example of a regulator circuit with a correction loop that can implement various techniques of this disclosure.

FIG. 5 is a block diagram of another example of a regulator circuit with a correction loop that can implement various techniques of this disclosure. The LDO regulator circuit 150 of FIG. 5 includes a main voltage regulation loop 132 and a correction loop 152. Components in FIG. 5 that are similar to components in FIG. 1 are labeled with similar reference numbers and, for purposes of conciseness, will not be described again.

The correction loop 152 can be configured to receive a representation of the regulated output voltage, e.g., a representation of VREG, compare the representation to a reference voltage, e.g., bandgap reference VBG, and control a device, such as a current sink, such as a FET 154, e.g., an N-type FET, that is coupled between the regulated output voltage and a lower voltage rail, such as ground, to correct the regulated output voltage VREG based on the comparison.

In some examples, one or both of the bandgap reference VBG and the representation of the regulated output voltage VREG can be buffered in order to avoid biasing the main voltage regulation loop 132. For example, in FIG. 5, a first buffer 156 can receive the bandgap reference VBG and a second buffer 158 can receive the representation of the regulated output voltage VREG generated by the resistor divider formed by resistors 160, 162.

In some example implementations, the resistors 160, 162 can be scaled with respect to resistors R1, R2 of the main voltage regulation loop 132. For example, a scaling factor of K can be used, e.g., where K>10, such that the resistor 160 has a resistance of K*R2 and the resistor 162 has a resistance of K*R1.

The corresponding outputs of the buffers 156, 158 can be coupled to corresponding low pass filter circuits 164, 166. The voltages can be low pass filtered in order to get the average values and filter out any variation. The correction loop 152 can be much slower than the main voltage regulation loop 132 due to the low pass filter circuits.

The outputs of the low pass filter circuits 164, 166 can be coupled to corresponding inputs of the amplifier circuit 168. The amplifier circuit 168 can compare the buffered and filtered versions of the bandgap reference and the regulated output voltage and, based on the comparison, control the current sink, e.g., the FET 154, to increase or decrease the amount of charge that is pulled from the output node VREG such that regulated voltage deviation is corrected. That is, as the regulated output voltage VREG increases undesirably, the difference between the voltages at the inputs of the amplifier circuit 168 of the correction loop 152 increases. In response, the amplifier circuit 168, e.g., an operational amplifier, can drive the gate of the FET 154 harder to sink more current and decrease the charge at the output node 106.

Figure 6:
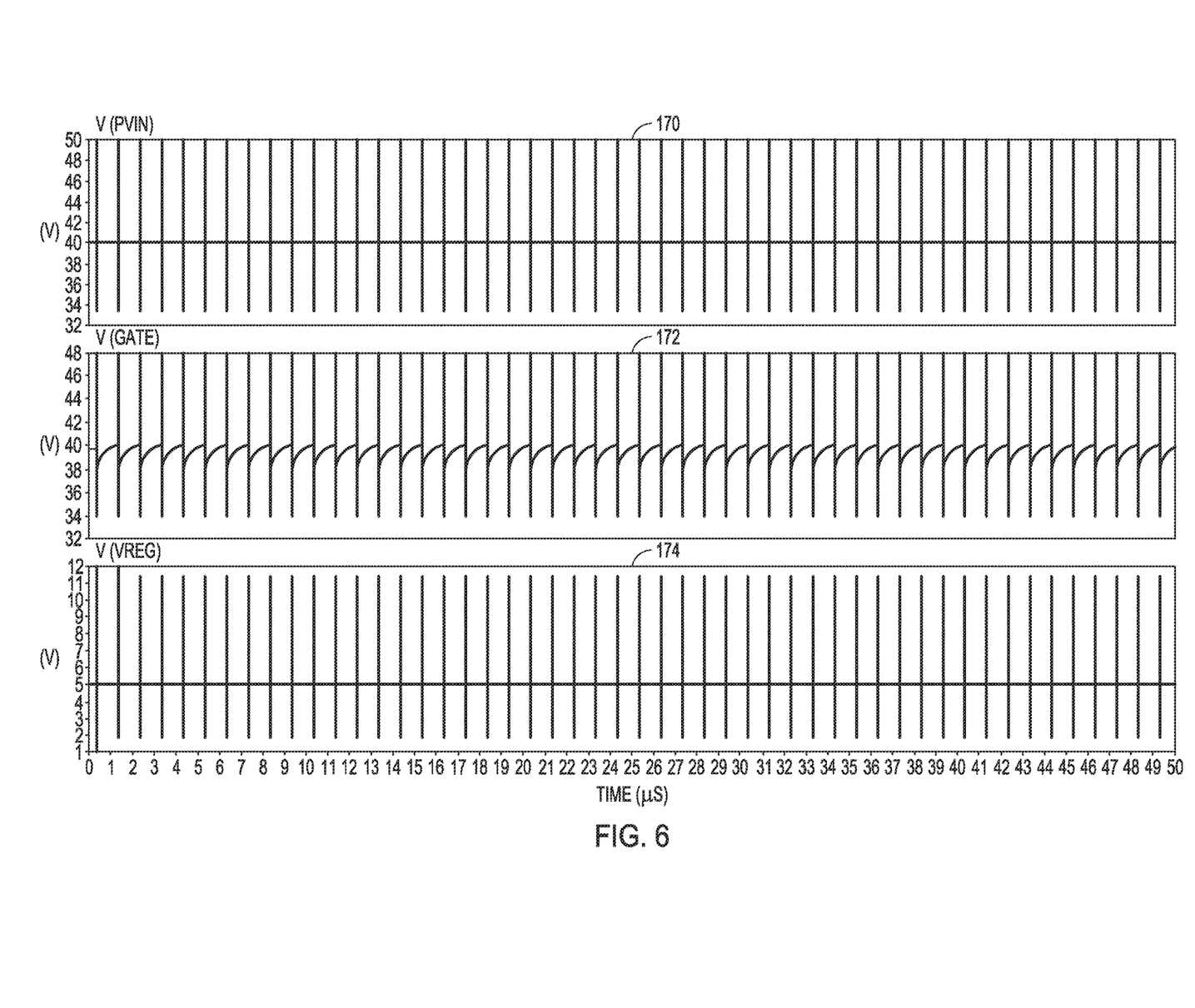
FIG. 6 are graphs from a computer simulation depicting a corrected regulated output voltage using the techniques of FIG. 5.

FIG. 6 are graphs from a computer simulation depicting a corrected regulated output voltage using the techniques of FIG. 5. As seen in FIG. 5, the LDO supply voltage PVIN, shown at graph 170, has a nominal voltage of 40V, but jumps between about 50V and 34V. Although not depicted, voltage variations can also occur on the ground node due to the laser firing. The gate voltage, shown at graph 172, on the pass transistor, e.g., pass transistor 104 of FIG. 5, is also changing. However, using the techniques of this disclosure, the regulated output voltage VREG, shown at graph 174, remains stable at 5V, in contrast to increasing as shown in graph 120 of FIG. 3. The techniques of this disclosure can prevent the deviation of the regulated output voltage VREG even with large variations in the LDO supply voltage PVIN and ground.

Figure 7:
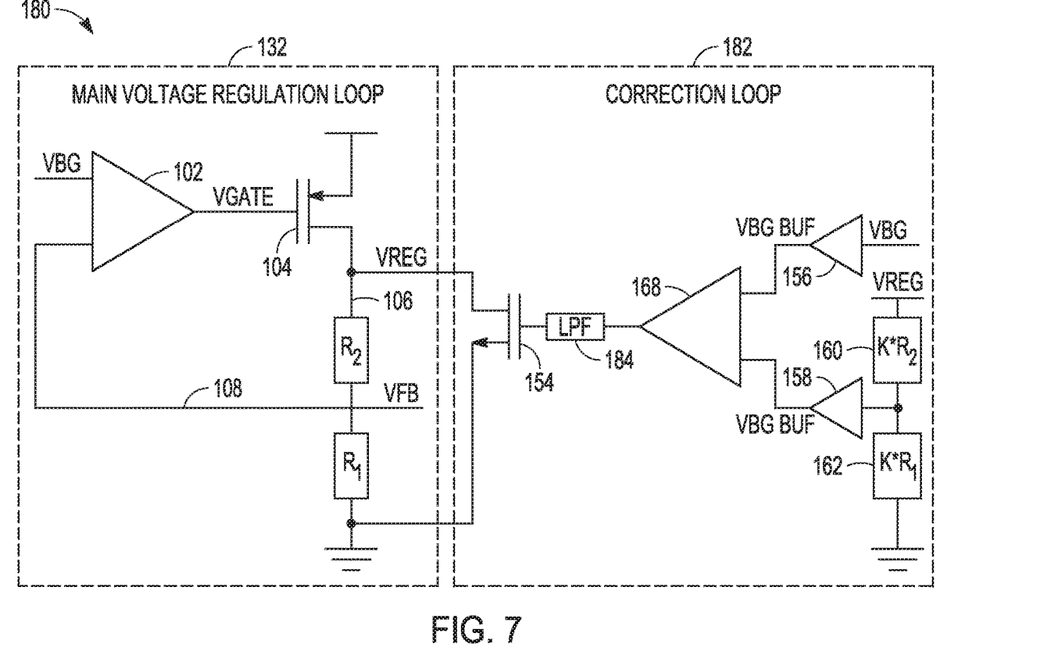
FIG. 7 is a block diagram of another example of a regulator circuit with a correction loop that can implement various techniques of this disclosure.

FIG. 7 is a block diagram of another example of a regulator circuit with a correction loop that can implement various techniques of this disclosure. The LDO regulator circuit 180 of FIG. 7 includes a main voltage regulation loop 132 and a correction loop 182. Components in FIG. 7 that are similar to components in FIGS. 1 and 5 are labeled with similar reference numbers and, for purposes of conciseness, will not be described again.

The correction loop 182 of FIG. 7 is similar to the correction loop 152 of FIG. 5, except that the two low pass filter circuits 164, 166 coupled to the inputs of the amplifier circuit 168 of FIG. 5 are replaced by a low pass filter circuit 184 coupled to the output of the amplifier circuit 168 of FIG. 7. The low pass filter circuit 184 can set the bandwidth of the correction loop 182 and can filter out any variations within the correction loop 182.

Figure 8:
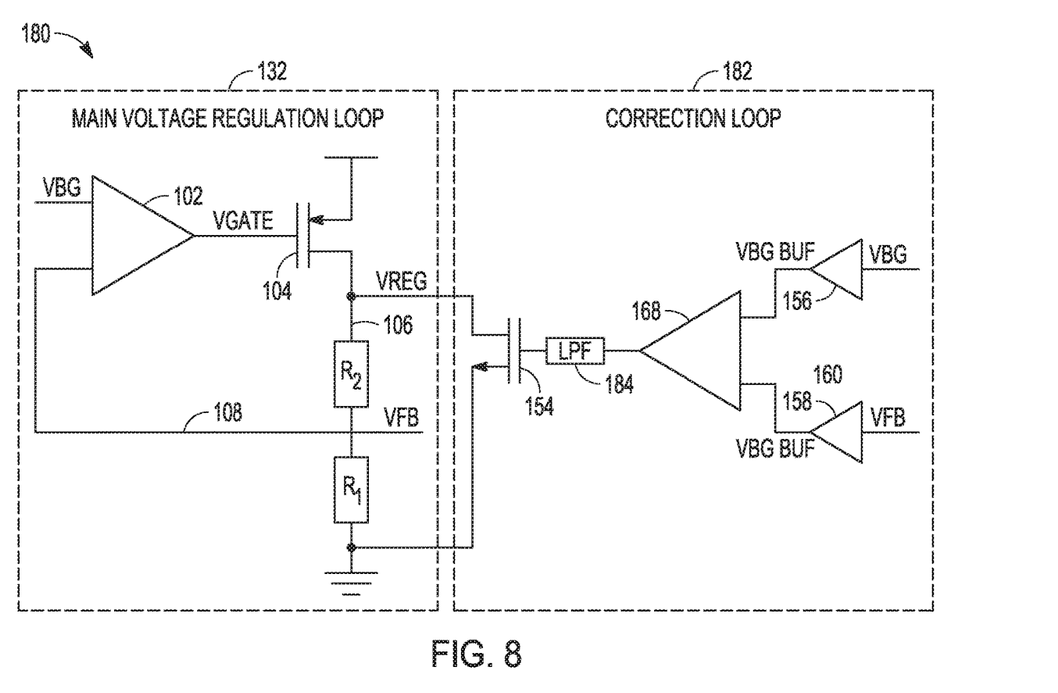
FIG. 8 is a block diagram of another example of a regulator circuit with a correction loop that can implement various techniques of this disclosure.

FIG. 8 is a block diagram of another example of a regulator circuit with a correction loop that can implement various techniques of this disclosure. The LDO regulator circuit 190 of FIG. 8 includes a main voltage regulation loop 132 and a correction loop 192. Components in FIG. 8 that are similar to components in FIGS. 1, 5, and 7 are labeled with similar reference numbers and, for purposes of conciseness, will not be described again.

The correction loop 192 of FIG. 8 is similar to the correction loop 182 of FIG. 7, except that the resistors 160, 162 of FIG. 7 have been removed. The feedback voltage VFB node can model the regulated output voltage VREG node and the feedback voltage VFB node can be used directly to sense the behavior of the main voltage regulation loop 132. With the resistors 160, 162 of FIG. 7 removed, as in FIG. 8, the buffered version of the feedback voltage VFB of the main voltage regulation loop 132 can be compared directly with the buffered version of the bandgap reference VBG.

Similar to FIG. 7, a low pass filter circuit 184 can be coupled to the output of the amplifier circuit 168. Although not depicted, in some examples, the low pass filter circuit 184 of FIG. 8 can be replaced by corresponding low pass filter circuits coupled to the inputs of the amplifier circuit, similar to the low pass filter circuits 164, 166 of FIG. 5.

Figure 9:
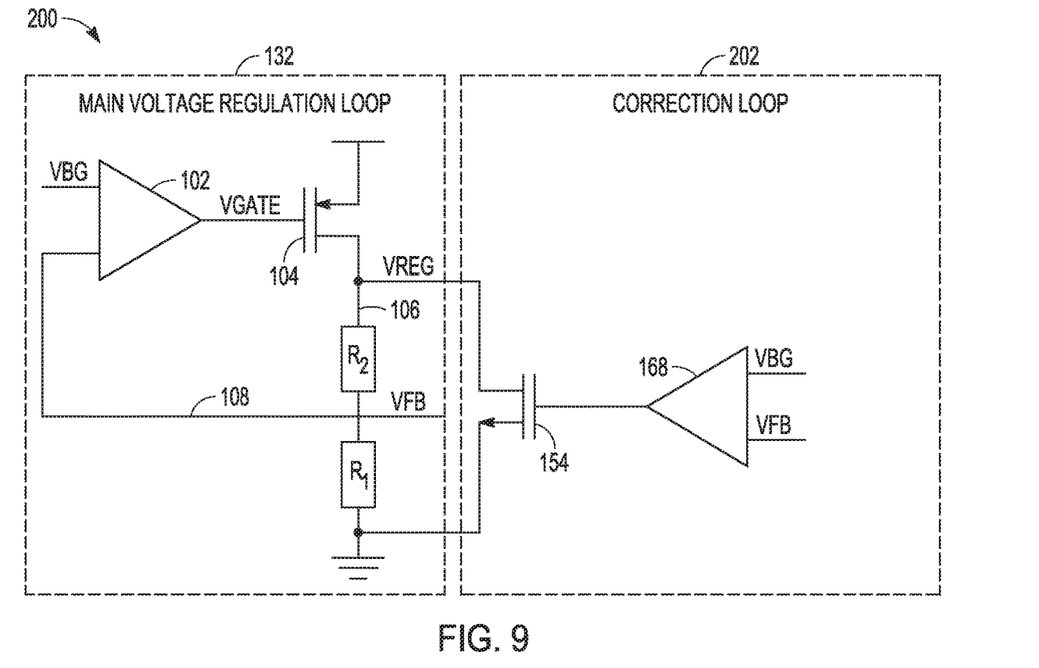
FIG. 9 is a block diagram of another example of a regulator circuit with a correction loop that can implement various techniques of this disclosure.

FIG. 9 is a block diagram of another example of a regulator circuit with a correction loop that can implement various techniques of this disclosure. The LDO regulator circuit 200 of FIG. 9 includes a main voltage regulation loop 132 and a correction loop 202. Components in FIG. 9 that are similar to components in FIGS. 1 and 5 are labeled with similar reference numbers and, for purposes of conciseness, will not be described again.

In some examples, the correction loop need not include filters, buffers, and/or a resistor divider, such as shown in the correction loop 202 of FIG. 9. The correction loop 202 can include an amplifier circuit 168 and a current sink 154, e.g., a FET. The amplifier circuit 202 can directly receive the bandgap reference VBG and the feedback voltage VFB of the main voltage regulation loop 132 and control the current sink 154 based on their difference.

Figure 10:
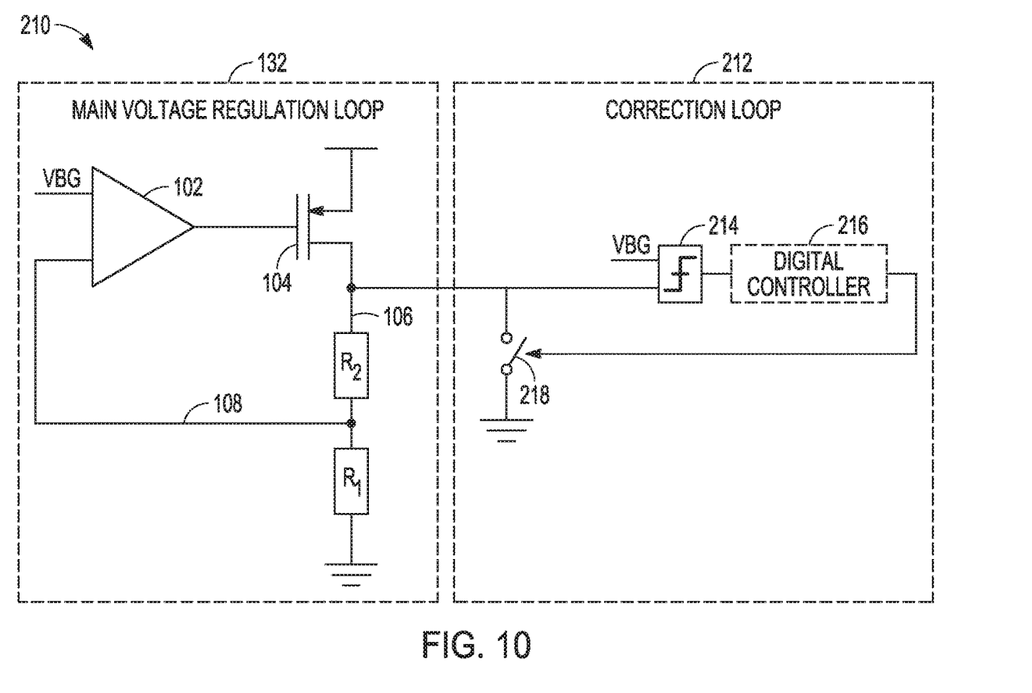
FIG. 10 is a block diagram of another example of a regulator circuit with a correction loop that can implement various techniques of this disclosure.

FIG. 10 is a block diagram of another example of a regulator circuit with a correction loop that can implement various techniques of this disclosure. The LDO regulator circuit 210 of FIG. 10 includes a main voltage regulation loop 132 and a correction loop 212. Components in FIG. 10 that are similar to components in FIG. 1 are labeled with similar reference numbers and, for purposes of conciseness, will not be described again.

In contrast to the analog correction loop techniques implemented in FIGS. 4, 5, 8, and 9, the LDO regulator circuit 210 of FIG. 10 includes a digital correction loop technique. The correction loop 212 of FIG. 10 can include a comparator circuit 214, an optional digital controller circuit 216, and a switch 218, such as a transistor.

In some examples that do not include the optional digital controller circuit 216, the output of the comparator circuit can be directly coupled to the switch 218. The comparator circuit 214 having one or more levels can receive a bandgap reference VBG and the regulated output voltage VREG, compare the two voltages, and control the switch based on the output.

In some examples that include the optional digital controller circuit 216, the comparator circuit 214 having one or more levels can receive a bandgap reference VBG and the regulated output voltage VREG, compare the two voltages, and output a signal to the digital controller circuit 216. As the difference between the two voltages changes, the digital controller circuit 216 can control the amount of time the switch 218 is ON to correct the regulated output voltage. For example, if the regulated output voltage VREG increases, the digital controller circuit 216 can increase the amount of time the switch 218 is ON in order to remove more charge from the output node 106, which can correct the regulated output voltage. In some examples, the digital controller circuit 216 can include one or more of a pulse-width modulation (PWM) controller and digital processing functionality. In some examples, a clocked comparator circuit can be used to reduce power.

The LDO regulator correction loop techniques described above can be used in many applications, such as LIDAR applications and power management products, particularly the products used in systems that include many interference sources, such as automotive products or next generation communication products. The correction loop can be designed to be lower power as compared to a push-pull LDO regulators because the correction loops of this disclosure concentrates on power line transients.

In addition, the techniques described above can be extended such that the proposed correction loop can be kept close to OFF and only turned ON when there is a supply transient, which can reduce the power consumption. An example of such a power reduction technique is described below with respect to FIG. 11.

Figure 11:
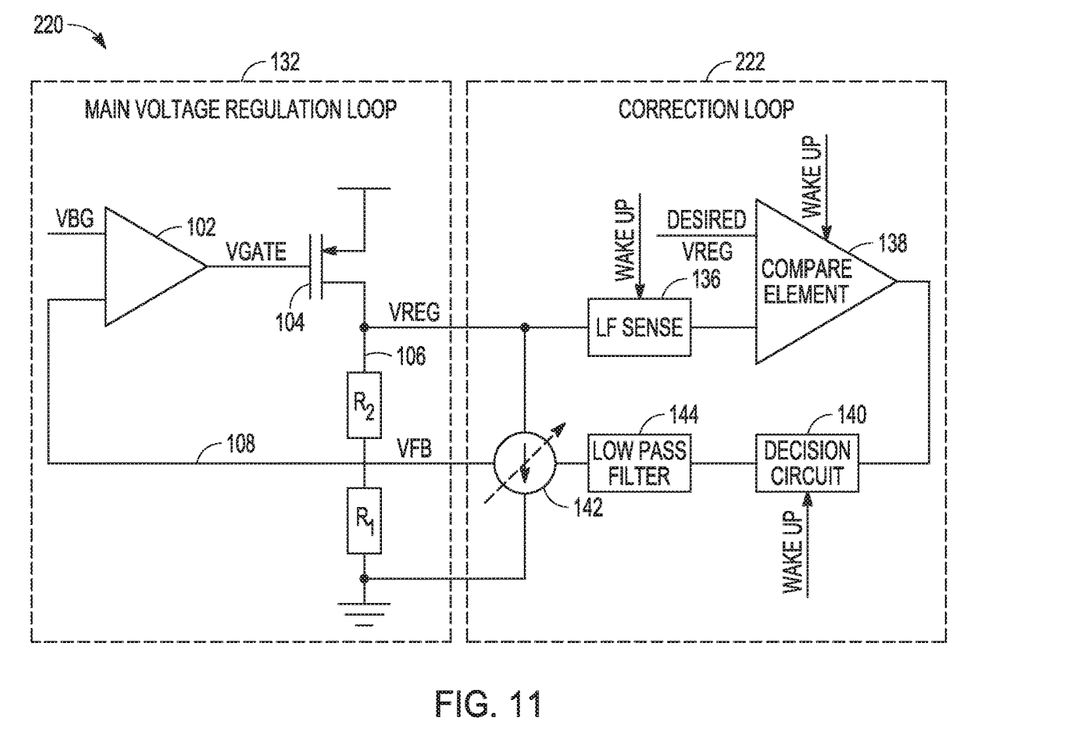
FIG. 11 is a block diagram of an example of a regulator circuit with a reduced power correction loop that can implement various techniques of this disclosure.

FIG. 11 is a block diagram of an example of a regulator circuit with a reduced power correction loop that can implement various techniques of this disclosure. The LDO regulator circuit 220 of FIG. 11 includes a main voltage regulation loop 132 and a correction loop 222. Components in FIG. 11 that are similar to components in FIG. 4 are labeled with similar reference numbers and, for purposes of conciseness, will not be described again.

One or more components of the reduced power correction loop 222 of FIG. 11 can be configured to be in a low-power state, such as in a quiescent state, until the component receives a wake-up signal. For example, one or more of a low frequency sense circuit 136, a comparison circuit 138, and a decision circuit 140 can be configured to be in a low-power state until the component receives a wake-up signal.

In some examples, the low frequency sense circuit 136 can be a resistor divider, as described above. In some such examples, a switch, e.g., transistor, can be coupled to the resistor divider such that, when the transistor is OFF, no current flows through the resistor divider. A wake-up signal can turn the transistor ON, when needed.

In some examples, the decision circuit 140 can be an amplifier circuit, such as operational amplifier. In some such examples, the operational amplifier can be configured to be in a low power state until a wake-up signal is received.

As described below with respect to FIG. 12, the wake-up signal can be generated by a low power hysteresis comparator.

Figure 12:
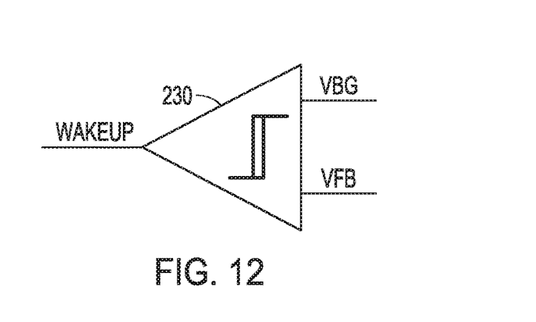
FIG. 12 is an example of a hysteresis comparator that can be used to reduce the power consumption in a correction loop in a low dropout regulator circuit.

FIG. 12 is an example of a hysteresis comparator that can be used to reduce the power consumption in a correction loop in a low dropout regulator circuit. The hysteresis comparator 230 can receive a representation of the bandgap reference VBG and the feedback voltage VFB. When supply transients cause a sufficient difference between the bandgap reference VBG and the feedback voltage VFB, the difference being set by the hysteresis of the comparator, the hysteresis comparator 230 toggles and generates an output signal WAKE-UP, and that signal wakes up one or more components of the correction loop 222, as shown in FIG. 11.

Notes

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A voltage regulator circuit configured to output a regulated output voltage, the voltage regulator circuit comprising:
    a main voltage regulation loop configured to generate the regulated output voltage; and
    a negative feedback correction loop having a bandwidth less than a bandwidth of the main voltage regulation loop, the correction loop configured to:
        receive a representation of the regulated output voltage and compare the representation to a reference voltage; and
        control a device coupled to an output of the main voltage regulation loop to correct the regulated output voltage based on the comparison.

2. The voltage regulator circuit of claim 1, wherein the correction loop includes:
    a comparator having one or more levels and configured to receive the representation of the regulated output voltage and compare the representation to the reference voltage and control the device based on an output of the comparator.

3. The voltage regulator circuit of claim 1, wherein the correction loop includes:
    a comparator having one or more levels and configured to receive the representation of the regulated output voltage and compare the representation to the reference voltage; and
    a digital controller configured to receive an output of the comparator and control the device based on the output of the comparator.

4. The voltage regulator circuit of claim 1, wherein the main voltage regulation loop includes:
    a first amplifier configured to receive a reference voltage and a feedback voltage representing the regulated output voltage; and
    a pass transistor coupled to an upper voltage rail and an output of the first amplifier, the pass transistor configured to generate the regulated output voltage; and
    wherein the correction loop includes:
    a second amplifier configured to:
        receive a representation of the at least one of the regulated output voltage or the feedback voltage and compare the representation to the reference voltage; and generate an output to control the low frequency current sink, wherein the low frequency current sink is coupled between the regulated output voltage and a lower voltage rail.

5. The voltage regulator circuit of claim 4, comprising:
    at least one low pass filter coupled to the second amplifier.

6. The voltage regulator circuit of claim 5, wherein the at least one low pass filter is coupled to an input of the second amplifier.

7. The voltage regulator circuit of claim 5, wherein the at least one low pass filter is coupled to an output of the second amplifier.

8. The voltage regulator circuit of claim 4, wherein the second amplifier configured to receive the representation of the at least one of the reference voltage or the feedback voltage and compare the representation to the reference voltage is configured to receive the representation of the regulated output voltage and compare the representation to the reference voltage, the voltage regulator circuit comprising:
  first and second buffers configured to receive the representation of the regulated output voltage and the reference voltage; and
  first and second low pass filters coupled to corresponding outputs of the buffers, the first and second low pass filters coupled to corresponding inputs of the second amplifier.

9. The voltage regulator circuit of claim 4, wherein the second amplifier configured to receive a representation of the at least one of the reference voltage or the feedback voltage and compare the representation to the reference voltage is configured to receive the representation of the regulated output voltage and compare the representation to the reference voltage, the voltage regulator circuit comprising:
  first and second buffers configured to receive the representation of the regulated output voltage and the reference voltage, wherein corresponding outputs of the first and second buffers are coupled to corresponding inputs of the second amplifier; and
  a low pass filter coupled to an output of the second amplifier.

10. The voltage regulator circuit of claim 4, wherein the second amplifier configured to receive a representation of the at least one of the reference voltage or the feedback voltage and compare the representation to the reference voltage is configured to receive the representation of the feedback voltage and compare the representation to the reference voltage, the voltage regulator circuit comprising:
  first and second buffers configured to receive the representation of the feedback voltage and the reference voltage, wherein corresponding outputs of the first and second buffers are coupled to corresponding inputs of the second amplifier; and
  a low pass filter coupled to an output of the second amplifier.

11. The voltage regulator circuit of claim 1, wherein the correction loop includes at least one component configured to switch between an ON state and a low-power state, the voltage regulator circuit comprising:
  a wake-up circuit configured to generate a wake-up signal to switch the at least one component to its ON state.

12. The voltage regulator circuit of claim 11, wherein the wake-up circuit includes a hysteresis comparator.

13. The voltage regulator circuit of claim 1, wherein the device is transistor.

14. A method of correcting a level of a regulated output voltage of a voltage regulator circuit, the method comprising:
  generating the regulated output voltage by a main voltage regulation loop;
  in a negative feedback correction loop having a bandwidth less than a bandwidth of the main voltage regulation loop:
    receiving a representation of the regulated output voltage and comparing the representation to a reference voltage; and
    controlling a device coupled to an output of the main voltage regulation loop to correct the regulated output voltage based on the comparison.

15. The method of claim 14, further comprising:
controlling, by a digital controller, the device based on the comparison.

16. The method of claim 14, further comprising:
controlling, by an amplifier, the device based on the comparison.

17. The method of claim 16, further comprising:
performing low pass filtering on the output of the amplifier or on at least one of the inputs of the amplifier.

18. The method of claim 14, wherein the correction loop includes at least one component configured to switch between an ON state and a low-power state, the method comprising:
  generating a wake-up signal to switch the at least one component to its ON state.

19. A voltage regulator circuit configured to generate a regulated output voltage, the voltage regulator circuit comprising:
  a main voltage regulation loop including:
    a first amplifier configured to receive a reference voltage and a feedback voltage representing the regulated output voltage;
    a pass transistor coupled to an upper voltage rail and an output of the error amplifier, the pass transistor configured to generate the regulated output voltage; and
  a negative feedback correction loop including:
    means for receiving at least one of the regulated output voltage or the feedback voltage; and
    means for controlling a current sink to sink current to adjust a level of the regulated output voltage.

20. The voltage regulator circuit of claim 19, wherein the negative feedback correction loop has a bandwidth less than a bandwidth of the main voltage regulation loop.

* * * * *